United States Patent
Rajagopalan

(10) Patent No.: US 6,380,349 B1
(45) Date of Patent: Apr. 30, 2002

(54) GOLF EQUIPMENT AND COMPOSITIONS COMPRISING SULFONATED, CARBOXYLATED, OR PHOSPHONATED IONOMERS

(75) Inventor: Murali Rajagopalan, South Dartmouth, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 09/459,322

(22) Filed: Dec. 13, 1999

(51) Int. Cl.[7] .......................... A63B 53/04; A63B 55/00
(52) U.S. Cl. .................. 528/295; 528/287; 528/293; 528/294; 528/391; 528/398; 526/278; 526/287; 525/340; 525/344; 525/353; 525/420; 525/535; 525/538; 473/349; 36/127; 206/315.3
(58) Field of Search .................. 525/340, 344, 525/353, 420, 535, 538; 526/278, 287; 528/287, 293, 294, 295, 391, 398; 473/349; 36/127; 206/315.3

(56) References Cited

U.S. PATENT DOCUMENTS

| | | |
|---|---|---|
| 3,097,194 A | 7/1963 | Leonard et al. ............ 260/88.2 |
| 3,290,276 A | 12/1966 | Anderson .................. 260/88.2 |
| 3,397,219 A | 8/1968 | Ford et al. ................. 260/448 |
| 3,642,728 A | 2/1972 | Canter ....................... 260/79.3 |
| 3,846,507 A | 11/1974 | Thomm et al. ............. 260/857 |
| 4,102,876 A | 7/1978 | Brenner et al. ............... 526/19 |
| 4,204,684 A | 5/1980 | Molitor .................. 273/167 R |
| 4,220,739 A | 9/1980 | Walles ........................ 525/344 |
| 4,234,184 A | 11/1980 | Deleens et al. ............ 273/235 |
| 4,238,376 A | * 12/1980 | Wilson |
| 4,255,540 A | 3/1981 | Weiss ......................... 525/332 |
| 4,331,786 A | 5/1982 | Foy et al. .................... 525/408 |
| 4,387,174 A | 6/1983 | Lundberg et al. ............. 524/66 |
| 4,615,914 A | 10/1986 | Walles ........................ 427/237 |
| 4,679,795 A | 7/1987 | Melvin ................... 273/235 R |
| 4,801,649 A | 1/1989 | Statz .......................... 525/183 |
| 4,809,978 A | 3/1989 | Yamaguchi et al. .......... 273/78 |
| 4,840,982 A | 6/1989 | Campbell et al. ........... 524/151 |
| 4,858,246 A | * 8/1989 | Wiggins |
| 4,858,924 A | 8/1989 | Saito et al. ................... 273/62 |
| 4,915,912 A | 4/1990 | Walles et al. ............... 422/160 |
| 4,919,434 A | 4/1990 | Saito ...................... 273/235 R |
| 4,986,545 A | 1/1991 | Sullivan .................... 273/235 |
| 5,064,556 A | 11/1991 | Brandes et al. ............. 252/135 |
| 5,098,105 A | 3/1992 | Sullivan .................... 273/235 |
| 5,108,684 A | * 4/1992 | Anton |
| 5,146,627 A | * 9/1992 | Weiser |
| 5,155,157 A | 10/1992 | Statz et al. ................. 524/423 |
| 5,239,010 A | 8/1993 | Balas et al. ................. 525/314 |
| 5,244,969 A | 9/1993 | Yamada ...................... 524/908 |
| 5,253,871 A | 10/1993 | Viollaz ....................... 273/228 |
| 5,321,089 A | 6/1994 | Cadorniga et al. .......... 525/196 |
| 5,334,673 A | 8/1994 | Wu ....................... 273/235 R |
| 5,359,000 A | 10/1994 | Hamada et al. ............... 525/74 |
| 5,422,398 A | 6/1995 | Weiss ......................... 525/178 |
| 5,465,969 A | 11/1995 | Cadorniga ............... 273/167 R |
| 5,484,870 A | 1/1996 | Wu ............................. 528/28 |
| 5,507,985 A | 4/1996 | Cadorniga .................. 264/45.3 |
| 5,556,098 A | 9/1996 | Higuchi et al. ............. 473/373 |
| 5,626,955 A | * 5/1997 | Goetz |
| 5,679,745 A | 10/1997 | Hamada et al. ............. 525/195 |
| 5,691,066 A | 11/1997 | Rajagopalan ................ 428/421 |
| 5,820,486 A | 10/1998 | Tanaka et al. ............... 473/374 |
| 5,857,925 A | 1/1999 | Sullivan et al. ............. 473/374 |
| 5,919,100 A | 7/1999 | Boehm et al. .............. 473/354 |
| 5,962,140 A | 10/1999 | Rajagopalan ................ 428/421 |
| 6,001,930 A | 12/1999 | Rajagopalan ................. 525/92 |

FOREIGN PATENT DOCUMENTS

| | | |
|---|---|---|
| DE | 40 15 164 A 1 | 11/1991 |
| EP | 0 148 632 A2 | 7/1985 |
| GB | 849058 | 9/1960 |
| GB | 907765 | 10/1962 |
| GB | 2 299 999 A | 10/1996 |
| JP | 50-018796 | * 2/1975 |
| JP | 8-103516 A | 4/1996 |
| WO | 96/39059 | * 12/1996 |

OTHER PUBLICATIONS

R.A. Weiss et al., "Properties of Polyethylene Modified with Phosphonate Side Groups. I. Thermal and Mechanical Properties", J. Polymer Science: Polymer Physics Ed., vol. 15, 1409–1425 (1977).
O. Olabisi, "Polyblends", Encyclopedia of Chemical Technology, 3rd Edition, vol. 18 474–478 (1982).
J.M. Willis et al., "Processing Morphology Relationships of Compatibilized Polyolefin/Polyamide Blends", J. Materials Science, vol. 26, 4742–4750 (1991).
X. Lu et al., "Specific Interactions and Ionic Aggregation in Miscible Blends of Nylon–6 and Zinc Sulfonated Polystyrene Ionomer", Macromolecules, vol. 25, 6185–6189 (1992).
Z. Gao et al., "Blends of Polyamide–6 and Sulfonated Polystyrene. A Solid–State NMR Study", Macromolecules, vol. 25, 6460–6465 (1992).
R.A. Weiss et al., "Phase Behaviour of Blends of Nylon 6 and Lightly Sulfonated Polystyrene Ionomers", Polymer, vol. 35, No. 9, 1963–1969 (1994).
P. Rajagopalan et al., "Molecular Interpretation of Miscibility in Polyamide–6 Blends with Alkali Ionomers of Sulfonated Polystyrene", J. Polymer Science Part B: Polymer Physics, vol. 33. 495–503 (1995).
R. A. Weiss et. al., "Morphology Control in Polyamide/Ionomer Blends", ANTEC '97, 2653–2657 (1997).
"Elastomers, Thermoplastic," Encyclopedia of Polymer Science and Engineering, 1987, 5:416.
Abstract of J0 6192512.

* cited by examiner

Primary Examiner—David J. Buttner
(74) Attorney, Agent, or Firm—Swidler Berlin Shereff Friedman, LLP

(57) ABSTRACT

The present invention relates to golf equipment, such as golf shoes, golf clubs, golf gloves, or portions thereof, formed from compositions comprising a sulfonated, carboxylated, or phosphonated acid moieties, or a mixture thereof. The preferred ionomer composition comprises sulfonated thermoplastic elastomers, sulfonated thermoplastic polymers, sulfonated thermoset polymers, and mixtures thereof. The compositions include a blend of about 1 weight % to about 99 weight % of at least one sulfonated, carboxylated, or phosphonated ionomer and about 99 weight % to about 1 weight % of at least co-component polymer. The co-component polymer may be a conventional ionomer, a thermoplastic, a thermoplastic elastomer, a thermoset polymer, or mixtures thereof.

36 Claims, No Drawings

GOLF EQUIPMENT AND COMPOSITIONS COMPRISING SULFONATED, CARBOXYLATED, OR PHOSPHONATED IONOMERS

FIELD OF THE INVENTION

The present invention is directed to compositions and methods for forming certain golf equipment, such as golf shoes, golf clubs, golf gloves, or portions thereof having improved properties with the subject compositions. The compositions of the invention comprise at least one ionomer formed from a sulfonated polymer, a phosphonated polymer, or a carboxylated polymer, their precursors, or a combination thereof.

BACKGROUND OF THE INVENTION

It is well known to even the average golfer that the equipment used in playing the game is subject to a great deal of friction, impact, and other stresses during a typical round of golf. Both the performance and the useful life of such equipment would benefit from the use of materials having improved resilience, dimensional stability, and increased durability. For instance, many types of golf clubs, such as putters, drivers, and wedges, contain polymer inserts in the face of the club. Obviously, since the club face directly strikes a golf ball thousands of times over the life of the club, improved resilience and durability are of great importance. Additionally, club components, such as shafts, grips, and hosels, undergo significant stress during a golf swing and contact with a golf ball and, therefore, could stand to benefit from more durable materials.

Another example is golf gloves, which undergo a lot of friction and wear and tear during a round of golf, not only from contact with, and friction from, golf club grips, but also from weather-related causes, such as excess moisture, heat, and ultraviolet radiation. Liners and, more specifically, polymer-reinforced liners (inner or outer liners), that are constructed of a more durable material, might provide a significant improvement in glove durability. Shoes are another type of golf equipment that receive a lot of stress and friction during a round (or multiple rounds) of golf. Shoe soles are flexed thousands of times per round and hundreds of thousands of times over the life of the shoe, as are the foot-beds and liners inside the shoes. Polymer or plastic spikes are, obviously, repetitively driven into, and scraped against cart paths, pavement, hard ground, and many other types of hard surfaces routinely encountered on golf courses.

Other types of golf equipment that require increased durability include various types of golf carts and course maintenance vehicles, golf bags and their associated framework, support legs and stands, golf tees, and fabrics designed for the potentially harsh (sun, rain, wind, hail, etc.) environments encountered by many golfers throughout the many seasons during which golf is played.

Golf equipment is typically formulated from a variety of different materials. One type of commonly employed polymer are ionomers of an ethylene-methacrylic acid neutralized by a metal ion. However, these conventional ionomeric materials do not entirely solve the problems associated with stress, durability, and repeated impact, as described above. Therefore, it is clear that improved materials, having material properties that address these preferred physical requirements, are necessary.

A handful of references are directed to golf equipment, such as golf clubs, having ionomer resins as part of their construction. U.S. Pat. No. 4,809,978 discloses a golf club head of a wood-type or an iron-type having a face plate formed of an ionomer resin having a Young's modulus in the range of 20 to 50 kg/mm$^2$. The thermoplastic ionomer resin is based on ethylene-methacrylic acid neutralized by a metal ion.

U.S. Pat. No. 4,204,684 discloses a golf club head and method of producing the same, wherein the head is fashioned of laminations or layers of resinous or plastic materials bonded together to form an integrated or composite head or body. The laminates are constructed of ethylene-methacrylic acid ionomers neutralized with a metal ion or polyamide resin.

U.S. Pat. Nos. 5,465,969 and 5,507,985 each disclose a golf club having a hollow metal head defining a cavity filled with a thermoplastic material produced from a thermoplastic polymer, a filler, and a chemical blowing agent. Suitable thermoplastic polymer materials include ethylene-methacrylic acid ionomers that have been neutralized by a metal ion and co-polymers of ethylene neutralized with a metal ion, non-neutralized copolymers of ethylene and methacrylic or acrylic acid, polyethylene, and polypropylene.

DE 4015164 discloses embossable foam latex, in pieces or as cut goods, for use in articles, such as sporting goods, golf shoes, golf gloves, and upholstery. A base latex is mixed with a thermoplastic and/or a thermoset polymer, such as a styrene-acrylate copolymer or terpolymer, carboxylated styrene-butadiene copolymer, vinyl acetate homopolymer, copolymer, or terpolymer, and thermoplastic polyurethane.

Several references disclose blends of sulfonated polystyrene ionomers and polyamide-6. For example, R. A. Weiss and X. Lu [*Macromol.*, 25:6185–6189 (1992)] disclose that, in compatible sulfonated ionomer/polyamide blends, a complex forms between the metal sulfonate of a sulfonated polystyrene ionomer and the amide moiety of polyamide-6.

U.S. Pat. No. 4,840,982 discloses a blend containing a matrix of an aromatic polymer (which may be polyamide, polyester, polycarbonate, or polyimide) in which is dispersed an impact modifier consisting of a minor portion of a carboxylated or sulfonated elastomer which is formed into an ionomer. A minor portion of a dispersion stabilizer must also be present. None of the above references, however, mention the utility of such materials in golf equipment.

There is still a need, however, for golf equipment having improved durability due to forming such equipment from polymer compositions comprising ionomeric material containing sulfonated, carboxylated, and/or phosphonated ionomers. Forming golf equipment from at least one sulfonated, carboxylated, and/or phosphonated ionomer can dramatically improve the ability to control the mechanical properties of the composition, including tensile and flexural modulus and impact strength.

SUMMARY OF THE INVENTION

The present invention is directed to golf equipment formed at least in part of a composition which comprises at least one ionomer formed from a polymer having at least one moiety selected from the group consisting of sulfonated, carboxylated, or phosphonated acid moieties, and mixtures thereof.

In one embodiment, the ionomer is a reaction product of a metal base and at least one of the sulfonated, carboxylated, phosphonated, or acid moieties. In another embodiment, the metal base comprises at least one metallic cation selected from the group consisting of Li, Na, Zn, Ca, Mg, K, Ti, Zr, W, Mn, Ni, Cu, and Sn. In a further embodiment, from about 1 mol % to about 99 mol % of the moieties of the ionomer are present in an ionic form. In a preferred embodiment, at least about 10 mol % of the moieties of the ionomer are present in an ionic form.

In another embodiment, the polymer is a sulfonated polymer selected from the group consisting of sulfonated thermoplastic elastomers, sulfonated thermoplastic polymers, sulfonated thermoset polymers, and mixtures thereof. Preferably, the sulfonated polymer contains from about 0.1 mol % to about 30 mol % sulfonated moieties. In still another embodiment, the polymer is a sulfonated thermoplastic elastomer having a flexural modulus from about 1,000 psi to about 150,000 psi.

In a further embodiment, the sulfonated thermoplastic elastomer is selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers, ethylene propylene ruber; ethylene-propylene diene terpolymer rubber; a thermoplastic elastomer blend comprising polypropylene and ethylene-propylene-diene terpolymer or ethylene-propylene copolymer rubber wherein the rubber is dynamically vulcanized; and mixtures thereof.

Preferably, the polymer is a sulfonated thermoplastic polymer having a flexural modulus from about 3,000 psi to about 500,000 psi. In another embodiment, the sulfonated thermoplastic polymer is selected from the group consisting of olefinic polymers; polyamides; polyesters; a polystyrene; poly(alkyl)acrylates; polycarbonates; polyphenylene oxide; polyether ketone; polysulfone; poly(phenylene sulfide); poly(ether imide); and mixtures thereof.

Preferably, the polymer is a sulfonated thermoset polymer and wherein the polymer has a flexural modulus from about 1,000 psi to about 150,000 psi. In still another embodiment, the sulfonated thermoset polymer is selected from the group consisting of poly(isoprene); poly(butadiene); poly(octenemer); styrene-butadiene rubber; ethylene-propylene-diene terpolymer rubber; ethylene-propylene copolymer rubber; nitrile rubber; butyl rubber; poly(urethane); poly(urea); poly(siloxane); and mixtures thereof. In a further embodiment, said composition further comprises at least one co-component polymer and wherein the composition comprises a blend of from about 1 weight % to about 99 weight % of said at least one ionomer formed from at least one of the sulfonated, carboxylated, or phosphonated acid moieties, and from about 99 weight % to about 1 weight % of said at least one co-component polymer.

In one embodiment, the co-component polymer is selected from the group consisting of conventional ionomers, non-ionomeric thermoplastic elastomers, non-ionomeric thermoplastic polymers, non-ionomeric thermoset polymers, and mixtures thereof. In a preferred embodiment, the co-component polymer is a non-ionomeric thermoplastic elastomer selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers, ethylene-propylene-diene terpolymer or ethylene-propylene copolymer rubber; a thermoplastic elastomer blend comprising polypropylene and ethylene-propylene-diene terpolymer or ethylene-propylene copolymer rubber wherein the rubber is dynamically vulcanized; and mixtures thereof. In another embodiment, the co-component polymer is a non-ionomeric thermoplastic polymer that comprises at least one olefinic polymer.

In another embodiment, the non-ionomeric thermoplastic polymer is a polyamide polymer having a flexural modulus from about 3,000 psi to about 500,000 psi. Preferably, the polyamide polymer is selected from the group consisting of polyamide homopolymers, polyamide copolymers, and mixtures thereof. In still another embodiment, the polyamide homopolymer is selected from the group consisting of polyamide 6; polyamide 11; polyamide 12; and mixtures thereof. Preferably, the polyamide copolymer is selected from the group consisting of polyamide 4,6; polyamide 6,6; polyamide 6,9; polyamide 6,10; polyamide 6,12; polyamide 6,18; polyamide 6,36; polyamide 6/6,6; polyamide 6,6/6,10; polyamide 6/6,T; polyamide 6/6,6/6,10; polyamide 6/6,6/6,18; polyamide 6/6,6/6,36; and mixtures thereof.

In still another embodiment, the co-component polymer is a thermoplastic polymer selected from the group consisting of poly(amides); poly(ethylene terephthalates); poly(butylene terephthalates); poly(trimethylene terephthalates); poly(ethylene naphthalates); poly(vinyl alcohols); poly(vinyl acetates); poly(silanes); poly(vinylidene fluorides); acrylonitrile-butadiene-styrene copolymers; and mixtures thereof.

In yet another embodiment, the polymer is a carboxylated polymer selected from the group consisting of carboxylated thermoplastic elastomers, carboxylated thermoplastic polymers, carboxylated thermoset polymers, and mixtures thereof.

In a further embodiment, the polymer is a phosphonated polymer selected from the group consisting of phosphonated thermoplastic elastomers, phosphonated thermoplastic polymers, phosphonated thermoset polymers, and mixtures thereof.

In a preferred embodiment, the golf equipment is selected from the group consisting of golf clubs, golf club head additions, club components, golf gloves, golf glove components, golf shoes, golf shoe components, golf bags, golf bag framework, with the proviso that golf balls are specifically excluded from this group. Preferably, the golf equipment is selected from the group consisting of golf clubs, golf shoes, golf gloves, and portions thereof.

The present invention is also directed to a composition comprising at least one ionomer formed from a polymer having at least one moiety selected from the group consisting of sulfonated, carboxylated, or phosphonated acid moieties, and mixtures thereof.

In one embodiment, the ionomer is a reaction product of a metal base and at least one of the sulfonated, carboxylated, phosphonated, or acid moieties. In another embodiment, the metal base comprises at least one metallic cation selected from the group consisting of Li, Na, Zn, Ca, Mg, K, Ti, Zr, W, Mn, Ni, Cu, and Pt. In a further embodiment, from about 1 mol % to about 99 mol % of the moieties of the ionomer are present in an ionic form. In a preferred embodiment, at least about 10 mol % of the moieties of the ionomer are present in an ionic form.

In another embodiment, the polymer is a sulfonated polymer selected from the group consisting of sulfonated thermoplastic elastomers, sulfonated thermoplastic polymers, sulfonated thermoset polymers, and mixtures thereof. Preferably, the sulfonated polymer contains from about 0.1 mol % to about 30 mol % sulfonated moieties. In still another embodiment, the polymer is a sulfonated thermoplastic elastomer having a flexural modulus from about 1,000 psi to about 150,000 psi.

In a further embodiment, the sulfonated thermoplastic elastomer is selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers, ethylene propylene ruber; ethylene-propylene diene terpolymer rubber; a thermoplastic elastomer blend comprising polypropylene and ethylene-propylene-diene terpolymer or ethylene-propylene copolymer rubber wherein the rubber is dynamically vulcanized; and mixtures thereof.

Preferably, the polymer is a sulfonated thermoplastic polymer having a flexural modulus from about 3,000 psi to about 500,000 psi. In another embodiment, the sulfonated thermoplastic polymer is selected from the group consisting of olefinic polymers; polyamides; polyesters; a polystyrene; poly(alkyl)acrylates; polycarbonates; polyphenylene oxide; polyether ketone; polysulfone; poly(phenylene sulfide); poly (ether imide); and mixtures thereof.

Preferably, the polymer is a sulfonated thermoset polymer and wherein the polymer has a flexural modulus from about 1,000 psi to about 150,000 psi. In still another embodiment, the sulfonated thermoset polymer is selected from the group consisting of poly(isoprene); poly(butadiene); poly (octenemer); styrene-butadiene rubber; ethylene-propylene-diene terpolymer rubber; ethylene-propylene copolymer rubber; nitrile rubber; butyl rubber; poly(urethane); poly (urea); poly(siloxane); and mixtures thereof. In a further embodiment, said composition further comprises at least one co-component polymer and wherein the composition comprises a blend of from about 1 weight % to about 99 weight % of said at least one ionomer formed from at least one of the sulfonated, carboxylated, or phosphonated acid moieties, and from about 99 weight % to about 1 weight % of said at least one co-component polymer.

In one embodiment, the co-component polymer is selected from the group consisting of conventional ionomers, non-ionomeric thermoplastic elastomers, non-ionomeric thermoplastic polymers, non-ionomeric thermoset polymers, and mixtures thereof. In a preferred embodiment, the co-component polymer is a non-ionomeric thermoplastic elastomer selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers, ethylene-propylene-diene terpolymer or ethylene-propylene copolymer rubber; a thermoplastic elastomer blend comprising polypropylene and ethylene-propylene-diene terpolymer or ethylene-propylene copolymer rubber wherein the rubber is dynamically vulcanized; and mixtures thereof. In another embodiment, the co-component polymer is a non-ionomeric thermoplastic polymer that comprises at least one olefinic polymer.

In another embodiment, the non-ionomeric thermoplastic polymer is a polyamide polymer having a flexural modulus from about 3,000 psi to about 500,000 psi. Preferably, the polyamide polymer is selected from the group consisting of polyamide homopolymers, polyamide copolymers, and mixtures thereof. In still another embodiment, the polyamide homopolymer is selected from the group consisting of polyamide 6; polyamide 11; polyamide 12; and mixtures thereof. Preferably, the polyamide copolymer is selected from the group consisting of polyamide 4,6; polyamide 6,6; polyamide 6,9; polyamide 6,10; polyamide 6,12; polyamide 6,18; polyamide 6,36; polyamide 6/6,6; polyamide 6,6/6,10; polyamide 6/6,T; polyamide 6/6,6/6,10; polyamide 6/6,6/6, 18; polyamide 6/6,6/6,36; and mixtures thereof.

In still another embodiment, the co-component polymer is a thermoplastic polymer selected from the group consisting of poly(amides); poly(ethylene terephthalates); poly (butylene terephthalates); poly(trimethylene terephthalates); poly(ethylene naphthalates); poly(vinyl alcohols); poly (vinyl acetates); poly(silanes); poly(vinylidene fluorides); acrylonitrile-butadiene-styrene copolymers; and mixtures thereof.

In yet another embodiment, the polymer is a carboxylated polymer selected from the group consisting of carboxylated thermoplastic elastomers, carboxylated thermoplastic polymers, carboxylated thermoset polymers, and mixtures thereof.

In a further embodiment, the polymer is a phosphonated polymer selected from the group consisting of phosphonated thermoplastic elastomers, phosphonated thermoplastic polymers, phosphonated thermoset polymers, and mixtures thereof.

The present invention is also directed to a method for forming golf equipment comprising the steps of providing at least one ionomer comprising a polymer having a moiety selected from the group consisting of sulfonated, carboxylated, or phosphonated acid moieties, and mixtures thereof, and forming golf equipment from said at least one ionomer.

DEFINITIONS

As used herein, the term "golf equipment" includes only golf clubs (i.e., putters, drivers, and wedges) and club attachments, additions, or modifications, such as striking face inserts; golf club components (i.e., shafts, hosels, and grips); golf club vibration damping devices; golf gloves and portions thereof, such as glove liners, securing methods, patches, and reinforcements; golf shoes and associated components (i.e., soles, footbeds and spike socket spines, heel counters, toe "puffs", uppers, midsoles, outsoles, liners, and plastic golf spikes); golf bags and their associated framework, support legs, and stands; and any portion of the above items, with the proviso that golf balls are specifically excluded from this group.

As used herein, the term "sulfonated, carboxylated, and phosphonated polymers" is defined as polymers, copolymers, and their precursors, comprising, respectively, sulfonate moieties, carboxylate moieties, phosphonate moieties, derivatives thereof, and mixtures of these polymers and copolymers, including, but not limited to, thermoplastic and thermoset elastomers.

As used herein, in discussing the present invention, the term "ionomers formed from sulfonated, carboxylated, or phosphonated polymers" are defined as polymers which comprise at least one sulfonic acid, carboxylic acid, or phosphonic acid moiety neutralized with a conjugate base, typically a cation such as a metal ion or a quaternary phosphonium or ammonium cation, and mixtures thereof.

As used herein, the term "conventional ionomer" is defined as a polymer which comprises a copolymer of ethylene, an optional softening comonomer which may be present in an amount up to about 50 weight % of the polymer, and selected from among an alkyl acrylate, alkyl methacrylate and mixtures thereof, and an acid present in an amount from about 5 weight % to about 35 weight % of the polymer and selected from the group consisting of acrylic acid, methacrylic acid and mixtures thereof, wherein the acid moiety is neutralized from about 1% to about 90% by at least one said cation.

As used herein, the term "sulfonated polymer" is intended to include both sulfonated polymers produced by copolymerization with a sulfonated monomer or polymers and copolymers sulfonated by using a sulfonation agent in a post-polymerization reaction.

As used herein, the term "carboxylated polymer" or "carboxylate" are intended to include both carboxylated polymers produced by copolymerization with a carboxylated monomer or polymers and copolymers carboxylated by using a carboxylation agent in a post-polymerization reaction, with the proviso that conventional ionomers, as defined above, are excluded.

As used herein, the term "phosphonated polymer" is intended to include both phosphonated polymers produced by copolymerization with a phosphonated monomer or polymers and copolymers phosphonated by using a phosphonation agent in a post-polymerization reaction.

As used herein, a "non-ionomeric polymer" is a polymer or copolymer which comprises substantially no ionic groups, i.e., a polymer or copolymer which is not an ionomer. For example, a non-ionomeric polymer may include a thermoplastic elastomer polymer ("TPE"), a thermoplastic polymer, a thermoset polymer, or any mixture thereof, none of these materials being ionomers.

As used herein, the term "co-component" is intended to include polymers selected from the group consisting of conventional ionomers, non-ionomeric thermoplastic elastomers, non-ionomeric thermoplastic polymers, non-ionomeric thermoset polymers, and mixtures and precursors thereof.

DETAILED DESCRIPTION OF THE INVENTION

The current invention relates to golf equipment formed from compositions having unexpectedly improved durability and wear or abrasion resistance. It has now been discovered that compositions comprising at least one ionomer formed from a sulfonated, carboxylated, or phosphonated polymer, their acid precursors, or a combination thereof, provide advantageous durability and wear resistance in golf equipment.

Additional embodiments of the present invention comprise golf equipment formed from various blends of at least one of the ionomers formed from a sulfonated, carboxylated, or phosphonated polymer as described above, combined with at least one other co-component polymer, which may be, for example, a conventional ionomer or a polyamide ("PA") present in the form of a homopolymer, a copolymer, or mixtures thereof.

The present invention provides great flexibility for selecting the modulus and hardness of each sulfonated, carboxylated, or phosphonated ionomer and, optionally, of their blends over a wider range than is possible with conventional ionomers or with blends composed solely of conventional ionomers and their acid precursors. This permits the manufacturer to manipulate properties of the golf equipment as desired, depending on the nature of the equipment and the environment it will be used in.

If desired, the sulfonated, carboxylated, or phosphonated polymer, or mixtures thereof, may be prepared by copolymerizing a sulfonated, carboxylated, or phosphonated monomer, or mixtures thereof, with at least one other comonomer. The sulfonated, carboxylated, or phosphonated monomer, or mixtures thereof, may further comprises a vinyl moiety, such as is suitable for copolymerization using polymerization initiators or catalysts, e.g., free radical, redox, metallocene, single-site, anionic, and cationic initiators. If so, the monomer may be characterized by the following formula:

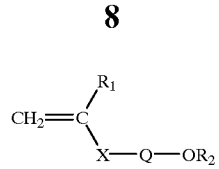

wherein $R_2$ is hydrogen, $-OR_5$ or $-NR_3R_4$ and $R_1, R_3, R_4$ and $R_5$ are, independently, hydrogen or an alkyl group (ranging from methyl to decyl) and may be linear or branched; X is aromatic or $(CH_2)_n$ where n is 0, 1, 2, 3 or 4; Q is one of the following:

and $R_6$ is $R_5$ or $-NR_3R_4$.

Preferably, when the sulfonated monomer comprises a vinyl group, the monomer has the following structure:

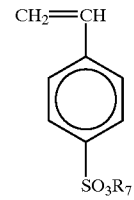

wherein $R_7$ is hydrogen or a linear or branched alkyl group ranging from methyl to decyl. Preferably, $R_7$ is a linear or branched alkyl group ranging from methyl to butyl. More preferably, $R_7$ is methyl.

Also preferably, when the phosphonated monomer comprises a vinyl group, the structure is:

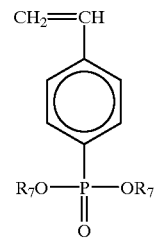

wherein $R_7$ is hydrogen or a linear or branched alkyl group ranging from methyl to decyl. Preferably, $R_7$ is a linear or branched alkyl group ranging from methyl to butyl. More preferably, $R_7$ is methyl.

The sulfonated, carboxylated, and phosphonated monomers, and mixtures thereof, suitable for condensation copolymerization are characterized by one of the following formulas:

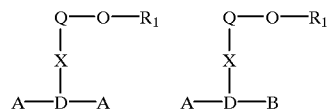

wherein $R_1$, X and Q are as defined above; A and B comprise functional groups reactive through condensation polymerization; and D comprises a functional group, not reactive through condensation polymerization, to which the reactive functional groups and the sulfonate, carboxylate, or phosphonate functionality, or mixtures thereof, are attached. The types of groups which may comprise A, B and D are well-known in the polymer art. For example, a copolyamide condensation can be modified to yield a partially sulfonated polymer as follows. A sulfonated diamine monomer, obtained when A is $NH_2$, D is ($CH_2$—$C_4H_7$—$CH_2$), X is $CH_2$ and Q is $SO_2$, may be copolymerized with 1,6-diaminohexane and adipic acid to yield a partially sulfonated polyamide 6,6 copolymer. B, for example, can be a carboxylic acid group.

The above example demonstrates the formation of partially sulfonated polyamides by condensation polymerization. However, as those skilled in the co-polymerization art will recognize, these techniques may be readily adapted to the formation of a variety of copolymers which are partially sulfonated, carboxylated, or phosphonated. For example, partially sulfonated, carboxylated, or phosphonated condensation copolymers include, but are not limited to, polyesters, polyacetals, polyurethanes, polyureas, and polysiloxanes.

Random, block, or alternating partially sulfonated, carboxylated, or phosphonated copolymers may be formed by methods known in the co-polymerization art. Random and block copolymers are preferred.

Alternatively, the sulfonated, carboxylated, or phosphonated polymer may be prepared by sulfonating, carboxylating, or phosphonating a substrate comprising a polymer, copolymer, and the like, with a sulfonation, carboxylation, or a phosphonation agent. Typically, a group comprising a sulfate, carboxylate, or phosphonate, or derivative thereof, is reacted with the substrate or grafted onto the substrate. Preferably, the substrate has an aromatic group, vinyl unsaturation, or both of these characteristics. More preferably, the substrate comprises an aromatic group. The aromatic group can be present in the main polymer chain of a polymeric substrate, in a side-group attached to the main polymer chain of a polymeric substrate, or both.

Suitable sulfonation agents, such as sulfonic acid, sulfuric acid, acyl sulfate, and methods for preparing such agents, are well known to those of ordinary skill in the art. Suitable techniques and phosphonation agents, such as dimethyl phosphite and phosphoric acid, are also well known to those of ordinary skill in the art. Suitable carboxylation techniques and agents, such as carbon dioxide or carboxylic acid, are also well known to those of ordinary skill in the art.

The sulfonated, carboxylated, or phosphonated polymer, or mixtures thereof, contains from about 0.1 mol % to about 30 mol % of combined sulfonated, carboxylated, and phosphonated groups. Preferably, the sulfonated, carboxylated, and/or phosphonated polymer contains from about 0.5 mol % to about 25 mol % of combined sulfonated, carboxylated, or phosphonated groups. More preferably, the sulfonated, carboxylated, and/or phosphonated polymer contains from about 1 mol % to about 20 mol % of combined sulfonated, carboxylated, and phosphonated groups.

Suitable substrates for sulfonation, carboxylation, and phosphonation post-polymerization reactions include polymers such as TPEs, thermoplastic polymers and thermoset polymers. Each of these groups of materials are discussed in detail below and are well known to those of ordinary skill in the art.

The preferred TPEs for use in this invention can be further characterized by chemical composition to comprise the following categories: (1) block copoly(ester) copolymers, (2) block copoly(amide) copolymers, (3) block copoly (urethane) copolymers, (4) styrene-based block copolymers, (5) thermoplastic elastomer blends wherein the elastomer is not vulcanized ("TEB"), and (6) thermoplastic elastomer or rubber blends wherein the elastomer is dynamically vulcanized ("TEDV"). Generally, the TPEs of categories (1), (2) and (3), containing heteroatoms, are polar TPEs. The TPEs of categories (4), (5) and (6) may be polar or nonpolar TPEs, as will be discussed in detail below for each of these categories.

Preferably, the Category (1) block copoly(ester) copolymer TPE is a block copoly(ester-ester), a block copoly(ester-ether), or mixtures thereof. More preferably, the block copoly(ester) copolymer TPE is at least one block copoly (ester-ether) or mixtures thereof. Suitable commercially available TPE copoly(ester-ethers) include the HYTREL® series from DuPont, the LOMOD® series from General Electric, ARNITEL® and URAFIL® from Akzo, ECDEL® from Eastman Kodak, and RITEFLEX® from Hoechst Celanese.

Preferably, Category (2) TPE's include block copoly (amide-ester), a block copoly(amide-ether), or mixtures thereof. More preferably, the block copoly(amide) copolymer TPE is at least one block copoly(amide-ether) or mixtures thereof. Suitable commercially available thermoplastic copoly(amide-ethers) include the PEBAX® series from Elf-Atochem, the GRILAMID® series by Emser, and VESTAMID® and VESTENAMER® by Hüls.

Preferably, the Category (3) TPE's include block copoly (urethane-ester), a block copoly(urethane-ether), or mixtures thereof. Examples of suitable commercially available thermoplastic polyurethanes include the ESTANE® series from the B.F. Goodrich Company, and the PELLETHANE® series from Dow Chemical.

Preferably, the Category (4) TPE's include thermoplastic SBS or SIS copolymers include the KRATON® D series from Shell Chemical and FINAPRENE® from Fina Oil and Chemical, thermoplastic SES copolymers include the KRATON® G series from Shell Chemical, SEPTON® from Kuraray, and C-FLEX® from Concept, commercially available styrene-block elastomers functionalized by grafting, such as the KRATON® FG 1901-X series from the Shell Corporation, hydroxy terminated TPE's, such as SEPTON® HG252 from the Mitsubishi Chemical Company.

Exemplary Category (5) TEBs are comprised of an ethylene-propylene-diene terpolymer ("EPDM"), ethylene-propylene copolymer rubber ("EPR") or nitrile rubber. Suitable TEBs include TELCAR® from Teknor Apex, TPR® from Advanced Elastomer Systems, REN-FLEX® from Dexter, and POLYTROPE® from Schulman.

The second group of thermoplastic elastomer blends, i.e., the Category (6) TEDVs, include SANTOPRENE®, VYRAM® and TREFSIN® from Advanced Elastomer Systems, the SARLINK® 2000 and 3000 series from DSM, and TELPRENE® from Teknor Apex. In particular, a melt-bondable TEDV, i.e., a polar TPE, is preferred when used in blends comprising polar polymers, such as polyamide and polycarbonate. An exemplary melt-bondable TEDV is available as SANTOPRENE® from Advanced Elastomer Systems and is thought to comprise a polypropylene-EPDM TEDV (wherein the EPDM is vulcanized with peroxide) to which maleic anhydride is grafted.

In forming a sulfonated, carboxylated, or phosphonated ionomer from the TPE substrate, the TPE is preferably sulfonated. Preferably, the sulfonated TPE is a block copoly (ester-ester), a block copoly(ester-ether), a block copoly (amide-ester), a block copoly(amide-ether), a block copoly (urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene terpolymer or ethylene-propylene copolymer rubber, a thermoplastic elastomer blend comprising polypropylene and ethylene-propylene-diene terpolymer or ethylene-propylene copolymer rubber wherein the rubber is dynamically vulcanized, a melt-bondable thermoplastic and elastomer blend wherein the rubber is dynamically vulcanized, or mixtures thereof.

Prior to sulfonation, carboxylation, or phosphonation, the TPE substrate of this invention generally has a Shore A hardness of at least about 40 or a Shore D hardness of at least about 15, as measured by ASTM method D-2240. Preferably, the Shore D hardness is from about 15 to about 75, more preferably from about 25 to about 55. Prior to sulfonation, carboxylation, or phosphonation, the TPE substrate of this invention typically has a flexural modulus, as measured by ASTM method D-790, of at least about 1,000 psi, preferably from about 1,000 psi to about 150,000 psi, more preferably from about 1,000 psi to about 85,000 psi.

After sulfonation, carboxylation, or phosphonation, the TPE polymer typically has a Shore A hardness of at least about 60 or a Shore D hardness of at least about 20, as measured by ASTM method D-2240. Preferably, the Shore D hardness is from about 20 to about 80, more preferably from about 25 to about 70. After sulfonation, carboxylation or phosphonation, the TPE substrate typically has a flexural modulus, as measured by ASTM method D-790, of at least about 1,200 psi, preferably from about 1,500 psi to about 170,000 psi, more preferably from about 1,500 psi to about 80,000 psi.

Other substrates which can be sulfonated, carboxylated, or phosphonated, then formed into ionomers useful in compositions forming golf equipment, can be described as thermoplastic polymers. In particular, the golf equipment of the present invention may comprise a thermoplastic polymer which is a thermoplastic or an engineering plastic; such as polycarbonate; polyamide; polyphenylene oxide; imidized amino group containing polymers; high impact polystyrene ("HIPS"); polyether ketone; polysulfone; poly(phenylene sulfide); poly(ether imide); and blends thereof.

In addition, the thermoplastic polymer substrate may be an olefinic polymer, i.e., a polymer comprising an olefin. As used herein, the term "olefinic polymer" means a polymer or a copolymer comprised of at least one olefin with attached linear or branched alkyl groups having from about 1 to about 18 carbon atoms. The term "olefinic polymer" includes the following specific materials: a polymer comprising an α-olefin containing from 2 to 10 carbon atoms; polymers formed with the use of metallocene or single-site catalysts and comprising monomers selected from the group consisting of butene, hexene, and octene; polymers formed with the use of metallocene or single-site catalysts and selected from the group consisting of a copolymer of ethylene and butene, a copolymer of ethylene and hexene and a copolymer of ethylene and octene; a terpolymer formed with the use of metallocene or single-site catalysts and consisting essentially of a polymer of ethylene, propylene, and a diene monomer; copoly(ethylene-vinyl alcohol); a copolymer consisting essentially of an α-olefin monomer containing from 2 to 10 carbon atoms and an alkyl acrylate or methacrylate monomer, wherein each alkyl group ranges, independently, from methyl to decyl inclusive and may be linear or branched; a copolymer consisting essentially of an α-olefin monomer containing from 2 to 10 carbon atoms and a glycidyl acrylate or a glycidyl alkylacrylate monomer, wherein the alkyl group ranges from methyl to decyl inclusive and may be linear or branched; a terpolymer consisting essentially of an α-olefin monomer containing from 2 to 10 carbon atoms, an alkyl acrylate or an alkyl alkylacrylate monomer, and a glycidyl acrylate or a glycidyl alkylacrylate monomer, wherein each alkyl group ranges, independently, from methyl to decyl inclusive and may be linear or branched; a copolymer consisting essentially of an α-olefin monomer containing from 2 to 10 carbon atoms and a vinyloxazoline or 1-alkyl vinyloxazoline monomer, wherein the alkyl group ranges from methyl to decyl inclusive and may be linear or branched; a terpolymer consisting essentially of an α-olefin monomer containing from 2 to 10 carbon atoms, an alkyl acrylate or methacrylate monomer, and a vinyloxazoline or 1-alkyl vinyloxazoline monomer, wherein each alkyl group ranges, independently, from methyl to decyl inclusive and may be linear or branched; a copolymer consisting essentially of an α-olefin monomer containing from 2 to 10 carbon atoms and carbon monoxide; a terpolymer consisting essentially of a first α-olefin monomer containing from 2 to 10 carbon atoms, a second α-olefin monomer containing from 2 to 10 carbon atoms, and carbon monoxide; a copolymer consisting essentially of an α-olefin monomer containing from 2 to 10 carbon atoms and maleic anhydride; a terpolymer consisting essentially of an α-olefin monomer containing from 2 to 10 carbon atoms, maleic anhydride, and carbon monoxide; a terpolymer consisting essentially of an α-olefin monomer containing from 2 to 10 carbon atoms, maleic anhydride, and sulfur dioxide; and a terpolymer consisting essentially of an α-olefin monomer containing from 2 to 10 carbon atoms, maleic anhydride, and an alkyl acrylate or methacrylate monomer, wherein each alkyl group ranges, independently, from methyl to decyl inclusive and may be linear or branched. Any of the olefinic polymers may also be functionalized by grafting with, e.g., maleic anhydride. Furthermore, the term "olefinic polymers" also encompasses mixtures of two or more olefinic polymers.

The copolymers formed with the use of metallocene or single-site catalysts useful in the present invention include those commercially available under the trade name AFFINITY® polyolefin plastomers and ENGAGE® polyolefin elastomers by DuPont-Dow Elastomers Company. Other commercially available polymers formed with the use of metallocene or single-site catalysts can be used, such as Exxon Chemical Company's EXACT® and Dow Chemical's INSIGHT® lines of resins, which have superior flexibility and clarity, as well as toughness. The EXACT® and INSIGHT® lines of polymers also have novel rheological behavior in addition to their other properties as a result of using a metallocene or single-site catalyst technology.

More preferably, the thermoplastic polymer substrate comprises an aryl group. Such thermoplastic polymers include but are not limited to polyesters, such as poly(ethylene terephthalate), poly(butylene terephthalate), poly(trimethylene terephthalate), and poly(ethylene naphthalate), polyamide, polycarbonate, polyphenylene oxide, polyether ketone, polysulfone, poly(phenylene sulfide), poly(ether imide), reinforced engineering plastics comprising an aromatic group, polystyrene, and blends thereof.

Before sulfonation, carboxylation, or phosphonation, the thermoplastic polymer substrate typically has a Shore D hardness of at least about 15, preferably from about 15 to about 80, more preferably from about 20 to about 75, as measured by ASTM method D-2240, and a flexural modulus, as measured by ASTM method D-790, typically of at least about 5,000 psi, preferably from about 5,000 psi to about 500,000 psi, more preferably from about 10,000 psi to about 300,000 psi.

After sulfonation, carboxylation or phosphonation, the sulfonated, carboxylated, or phosphonated thermoplastic polymer typically has a Shore D hardness of at least about 20, preferably from about 20 to about 85, as measured by ASTM method D-2240, a flexural modulus, as measured by ASTM method D-790, typically of at least about 10,000 psi, preferably from about 15,000 psi to about 500,000 psi.

Nonpolar thermoset polymers include, but are not limited to, nonpolar rubbers, such as poly(isoprene), both natural and synthetic, poly(butadiene), poly(octenemer), styrene-butadiene rubber, EPDM rubber, EPR, nitrile rubber, and butyl rubber. Polar thermoset polymers include but are not limited to polar rubbers, such as poly(chloroprene), poly(urethane), poly(urea), poly(siloxane), vinylidene fluoride-hexafluoropropylene copolymer rubber, polysulfide rubber, and epichlorohydrin rubber.

Preferably, the thermoset polymer substrate comprises polybutadiene, polyisoprene, thermoset poly(urethane), thermoset poly(urea), or mixtures thereof. More preferably, the thermoset polymer substrate is a polar thermoset polymer including but not limited to a thermoset poly(urethane), a thermoset poly(urea), or mixtures thereof.

Before sulfonation, carboxylation, or phosphonation, the thermoset polymer substrate typically has a Shore D hardness of at least about 15, preferably from about 15 to about 80, more preferably from about 20 to about 80, as measured by ASTM method D-2240, and a flexural modulus, as measured by ASTM method D-790, typically of at least about 1,000 psi, preferably from about 1,000 psi to about 100,000 psi, more preferably from about 1,000 psi to about 50,000 psi.

After sulfonation, carboxylation, or phosphonation, the thermoset polymer typically has a Shore D hardness of at least about 20, preferably from about 25 to about 80, as measured by ASTM method D-2240, a flexural modulus, as measured by ASTM method D-790, typically of at least about 1,500 psi, preferably from about 1,500 psi to about 150,000 psi, more preferably from about 1,500 psi to about 50,000 psi.

Preferably, the quantity of the total sulfonated, carboxylated, or phosphonated moieties neutralized by the base to their ionic form ranges from about 1 mol % to about 90 mol % in the sulfonated, carboxylated, or phosphonated ionomer. More preferably at least about 10 mol %, most preferably at least about 20 mol %, of the sulfonated, carboxylated, or phosphonated moieties are present in their ionic form.

If desired, and in addition to the ionic moieties formed by neutralization or hydrolysis, the sulfonated, carboxylated, or phosphonated ionomer may also contain acid moieties, i.e., sulfonic, carboxylic, or phosphonic acid, and ester moieties thereof, i.e., sulfonated, carboxylated, or phosphonated esters. When present, the percentage, in weight percent, of ionic/acid/ester moieties, respectively, ranges from about 1/1/30 to about 90/70/70 provided that the total amount of ionic, acid and ester moieties present is 100 weight percent.

The ionomer formed from a sulfonated, carboxylated, or phosphonated polymer typically has a Shore A hardness of at least about 40 or a Shore D hardness of at least about 15, as measured by ASTM method D-2240. Preferably, the Shore D hardness is typically from about 20 to about 80, more preferably from about 25 to about 70. The sulfonated, carboxylated, or phosphonated ionomer has a flexural modulus, as measured by ASTM method D-790, typically of at least about 1,000 psi, preferably from about 3,000 psi to about 100,000 psi, more preferably from about 3,000 psi to about 80,000 psi.

While not wishing to be bound by any particular theory, sulfonated ionomers are thought to exhibit desirable properties because of the higher ionic strength of sulfonic acids compared to carboxylic acids. Sulfonic acids and their salts are thought to form more polar aggregates, sometimes known as clusters. A higher degree of aggregation typically results in a higher glass transition temperature and higher melt viscosity for sulfonated ionomers relative to conventional ionomers. Thus, a lower amount of sulfonation is thought to be necessary to achieve a particularly desirable property level, e.g., of a mechanical property such as the flexural modulus and impact durability. Alternatively, because the sulfonated ionomer aggregates are more polar, lower degrees of neutralization or lower levels of multivalent cations, or both, are thought to be required to achieve a desired property level.

Furthermore, as phosphonic acids are even stronger acids than sulfonic acids, phosphonated ionomers are believed to form even more polar aggregates than sulfonated ionomers. Thus, a lower amount of phosphonation, as compared even to sulfonation, is thought to be necessary to achieve a particularly desirable property level. Therefore, the compositions of the present invention provide vast flexibility in achieving a balance of properties desirable for use in golf equipment by allowing for the formation of blends of sulfonated ionomers, blends of phosphonated ionomers, blends of carboxylated ionomers, or mixtures thereof, all optionally blended with at least one co-component polymer, such as a conventional ionomer.

Preferably, sulfonated ionomers formed from polymers and copolymers comprising sulfonate groups are used to form the blends of this invention. As used herein, "sulfonated groups" includes sulfonic acid, sulfonate ester and sulfonamide forms that may be present as any or all combinations thereof before the ionomer is formed. More preferably, the sulfonated ionomers used to form the blends of this invention are formed from sulfonated polymers comprising sulfonic acid groups, sulfonamide groups or mixtures thereof.

Optionally, the sulfonated, carboxylated, or phosphonated ionomer may be mixed with at least one co-component polymer to form a composition of the invention.

The co-component polymer may be a non-ionomeric polymer, for example, a thermoplastic polymer, a TPE, or a thermoset polymer. In particular, when the golf equipment of the present invention comprises a thermoplastic polymer, such a polymer may be any thermoplastic or engineering plastic such as discussed in detail above. The non-ionomeric polymer, optionally mixed with the sulfonated, carboxylated, or phosphonated ionomer, may comprise a polyamide or polyamide blocks.

The polyamide co-component most useful in forming the compositions used to fabricate the golf equipment of this invention is a thermoplastic with repeating amide groups. These are commonly known as nylons. This co-component can be comprised of a homopolymer, a copolymer, including a block copolymer, or a blend of any or all of the above types of polyamides.

Polyamide homopolymers are produced by two common methods. In the first, a compound containing one organic acid-type end-group and one amine end-group is formed into a cyclic monomer. The polyamide is then formed from the monomer by a ring-opening polymerization. These polyamides are commonly designated as polyamide 6, polyamide 11, polyamide 12, etc., where the number indicates the number of carbon atoms making up the ring in the monomer. The second method involves the condensation polymerization of a dibasic acid and a diamine. These polyamides are commonly designated as polyamide 4,6; polyamide 6,6; polyamide 6,9; polyamide 6,10; polyamide 6,12; polyamide 6,18; polyamide 6,36;etc., where the first number indicates the number of carbon atoms connecting the two amine groups in the diamine and the second number indicates the number of carbon atoms connecting the two acid groups in the dibasic acid, including those in the acid groups.

Preferred polyamide homopolymers and copolymers include polyamide 4; polyamide 6; polyamide 7; polyamide 11; polyamide 12; polyamide 13; and mixtures thereof. More preferred polyamide homopolymers include polyamide 6; polyamide 11; polyamide 12; and mixtures thereof.

Alternatively, the polyamide may comprise an aromatic group. For example, a polyamide formed by condensation polymerization may be formed from an aliphatic diacid and a diamine comprising an aromatic group.

Preferred aromatic polyamides are formed from the monomers m-phenylenediamine, p-phenylenediamine, m-xylylenediamine, isophthalic acid, terephthalic acid, 2,6-naphthalenedicarboxylic acid and mixtures thereof.

Polyamide copolymers are produced by several common methods. They are produced from ring-opening polymerization by using two or more cyclic monomers with different numbers of carbon atoms making up each monomeric ring. Additionally, polyamide copolymers are produced from condensation polymerization by using a single dibasic acid and two or more different diamines. Alternatively, polyamide copolymers are produced by a condensation polymerization reaction by using a single diamine and two or more different dibasic acids, as described above, or by using two or more different diamines and dibasic acids. Further, polyamide copolymers are produced by blending two or more polyamide melts and holding the materials in the molten state for a sufficient time period such that partial or full randomization occurs.

Preferred polyamide copolymers include polyamide 4,6; polyamide 6,6; polyamide 6,9; polyamide 6,10; polyamide 6,12; polyamide 6,18; polyamide 6,36; polyamide 12,12; polyamide 13,13; polyamide 6/6,6, polyamide 6,6/6,10, polyamide 6/6,T, polyamide 6/6,6/6,10; polyamide 6/6,6/6, 18; polyamide 6/6,6/6,36; and mixtures thereof. The polyamide co-component of this invention, when present, typically has a Shore D hardness of at least about 40, as measured by ASTM method D-2240, a flexural modulus, as measured by ASTM method D-790, typically of at least about 3,000 psi, preferably from about 3,000 psi to about 500,000 psi, more preferably from about 50,000 psi to about 500,000 psi, and a melt index from about 0.5 to about 100 g/10 min, as measured by ASTM method D-1238, condition E using a 2.16 kg weight.

The co-component polymer generally has a Shore D hardness of at least about 20, preferably from about 25 to about 70, as measured by ASTM method D-2240, and a flexural modulus, as measured by ASTM method D-790, typically of at least about 1,000 psi, preferably from about 1,000 psi to about 500,000 psi.

In the case of blends of a sulfonated, carboxylated, or phosphonated ionomer with a co-component polymer, such blends may comprise from about 99% to about 1% by weight of at least one ionomer formed from a sulfonated, carboxylated, and/or phosphonated polymer and from about 1% to about 99% by weight of at least one co-component polymer. Preferably, the blend comprises from about 95% to about 5% by weight of the sulfonated, carboxylated, and/or phosphonated ionomer and from about 5% to about 95% by weight of the co-component polymer. More preferably, the blend comprises from about 90% to about 15% by weight of the sulfonated, carboxylated, or phosphonated ionomer and from about 10% to about 85% by weight of the co-component polymer. Most preferably, the blend comprises from about 75% to about 15% by weight of at least one ionomer formed from sulfonated, carboxylated, or phosphonated polymer and from about 25% to about 85% by weight of at least one co-component polymer.

The polymer blends of this invention can be prepared with blend components of varying molecular architecture as is well known to those knowledgeable in the art of blending polymers. Examples of the parameters which may be varied include molecular weight, molecular weight distribution, tacticity, and optionally, branching, degrees and arrangements of blocks, block molecular weight and block molecular weight distribution. Also, parameters relating to the amount, type, and distribution of sulfonation, carboxylation, and phosphonation may be varied. Furthermore, the specific counterion(s) used to form the ionomer from the sulfonated, carboxylated, or phosphonated polymer, the percentage of sulfonated, carboxylated, or phosphonated groups which are neutralized to form the ionomer, and optionally the percentage of sulfonated, carboxylated, or phosphonated groups of the ionomer which are esterified, are further examples of the parameters which may be varied in preparing the blend components of this invention.

Either injection molding, extrusion, compression molding, or any other polymer processing methods available to those of ordinary skill in the art may be used to form golf equipment comprising the polymeric materials formulated as described herein. For example, a composition as described herein can be thermoformed and, thus, can be compression molded. Alternatively, when the golf equipment or components therefor are injection molded from a composition as described herein, a physical or chemical blowing or foaming agent may be included to produce a foamed component. For example, an organic or inorganic blowing agent or a gas, such as air, nitrogen, or carbon dioxide, can also be added to the composition during the injection molding process.

Additionally, a foamed composition as described herein may be formed by blending microspheres with the composition either during or before the molding process. Polymeric, ceramic, metal, and glass microspheres are useful in the invention, and may be solid or hollow and filled or unfilled. In particular, microspheres up to about 1000 $\mu$m in diameter are useful.

Additional materials conventionally included in polymer compositions may be added to the compositions of the invention to enhance the formation of the golf equipment disclosed herein. These additional materials include, but are not limited to, dyes, pigments, UV absorbers, processing aids, metal particles, such as metal flakes, powders, and mixtures thereof, and other conventional additives. Antioxidants, stabilizers, softening agents, plasticizers, including internal and external plasticizers, impact modifiers, toughening agents, foaming agents, fillers, reinforcing materials, and compatibilizers can also be added to any composition of the current invention. All of these materials, which are well known in the art, are added for their usual purpose in typical amounts. Nucleating agents may optionally be added to any composition of the invention comprising a non-amorphous polymer or copolymer.

The compositions of the invention can be reinforced by blending with a wide range of fillers, e.g., glass fibers, inorganic particles and metal particles, as is known to those with skill in the art.

The present invention is further directed to a method of making golf equipment, comprising forming a composition comprising at least one ionomer formed from a sulfonated, carboxylated, or phosphonated polymer, optionally blended with at least one co-component polymer, suitable for including in the above golf equipment, and then forming the golf equipment from the composition.

For example, if the compositions of the current invention are to be blended, the blends of the invention are formed by combining the polymer components by methods familiar to those in the polymer blending art, for example, with a two roll mill, a Banbury mixer or a single or twin-screw extruder. Preferably, the normally higher-melting polyamide component is first melted in the main extruder and the molten sulfonated, carboxylated, or phosphonated component is introduced as a side-stream into a main extruder conveying molten polyamide where the two melts are intermixed to form a blend.

The term "about," as used herein in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. Golf equipment selected from the group consisting of golf club head additions, golf bags, golf bag framework, and portions thereof formed of a composition which comprises at least one ionomer formed from a polymer having a sulfonated ionomeric moiety.

2. The golf equipment of claim 1, wherein the ionomer is a reaction product of a metal base and a sulfonated acid moiety.

3. The golf equipment of claim 2, wherein the metal base comprises at least one metallic cation selected from the group consisting of Li, Na, Zn, Ca, Mg, K, Ti, Zr, W, Mn, Ni, Cu, and Pt.

4. The golf equipment of claim 1, wherein from about 1 mol % to about 90 mol % of the moieties of the acid are present in an ionic form.

5. The golf equipment of claim 4, wherein at least about 10 mol % of the moieties of the acid are present in an ionic form.

6. The golf equipment of claim 1, wherein the polymer is a sulfonated polymer selected from the group consisting of sulfonated thermoplastic elastomers, sulfonated thermoplastic polymers, sulfonated thermoset polymers, and mixtures thereof.

7. The golf equipment of claim 6, wherein the sulfonated polymer contains from about 0.1 mol % to about 30 mol % sulfonated moieties.

8. The golf equipment of claim 6, wherein the polymer is a sulfonated thermoplastic elastomer having a flexural modulus from about 1,200 psi to about 170,000 psi.

9. The golf equipment of claim 8, wherein the sulfonated thermoplastic elastomer is selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers; a thermoplastic elastomer blend comprising polypropylene and ethylene-propylene-diene terpolymer or ethylene-propylene copolymer rubber wherein the rubber is dynamically vulcanized; and mixtures thereof.

10. The golf equipment of claim 6, wherein the polymer is a sulfonated thermoplastic polymer having a flexural modulus from about 3,000 psi to about 500,000 psi.

11. The golf equipment of claim 10, wherein the sulfonated thermoplastic polymer is selected from the group consisting of olefinic polymers; polyamides; polyesters; a polystyrene; poly(alkyl)acrylates; polycarbonates; polyphenylene oxides; polyether ketones; polysulfones; poly(phenylene sulfides); poly(ether imides); and mixtures thereof.

12. The golf equipment of claim 6, wherein the polymer is a sulfonated thermoset polymer and wherein the polymer has a flexural modulus from about 1,200 psi to about 170,000 psi.

13. The golf equipment of claim 12, wherein the sulfonated thermoset polymer is selected from the group consisting of poly(isoprene); poly(butadiene); poly(octenemer); styrene-butadiene rubber; ethylene-propylene-diene terpolymer rubber; ethylene-propylene copolymer rubber; nitrile rubber; butyl rubber; poly(urethane); poly(urea); poly(siloxane); and mixtures thereof.

14. The golf equipment of claim 1, wherein said composition further comprises at least one co-component polymer and wherein the composition comprises a blend of from about 1 weight % to about 99 weight % of said at least one ionomer and from about 99 weight % to about 1 weight % of said at least one co-component polymer.

15. The golf equipment of claim 14, wherein the co-component polymer is selected from the group consisting of conventional ionomers, non-ionomeric thermoplastic elastomers, non-ionomeric thermoplastic polymers, non-ionomeric thermoset polymers, and mixtures thereof.

16. The golf equipment of claim 15, wherein the co-component is a non-ionomeric thermoplastic elastomer selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic; a thermoplastic elastomer blend comprising polypropylene and ethylene-propylene-diene terpolymer or ethylene-propylene copolymer rubber wherein the rubber is dynamically vulcanized; and mixtures thereof.

17. The golf equipment of claim 15, wherein the co-component polymer is a non-ionomeric thermoplastic polymer that comprises at least one olefinic polymer.

18. The golf equipment of claim 17, wherein the non-ionomeric thermoplastic polymer is a polyamide polymer having a flexural modulus from about 3,000 psi to about 500,000 psi.

19. The golf equipment of claim 18, wherein the polyamide polymer is selected from the group consisting of polyamide homopolymers, polyamide copolymers, and mixtures thereof.

20. The golf equipment of claim 19, wherein the polyamide polymer is a polyamide homopolymer selected from the group consisting of polyamide 6; polyamide 11; polyamide 12; and mixtures thereof.

21. The golf equipment of claim 19, wherein the polyamide polymer is a polyamide copolymer selected from the group consisting of polyamide 4,6; polyamide 6,6; polyamide 6,9; polyamide 6,10; polyamide 6,12; polyamide 6,18; polyamide 6,36; polyamide 6/6,6; polyamide 6,6/6,10; polyamide 6/6,T; polyamide 6/6,6/6,10; polyamide 6/6,6/6,18; polyamide 6/6,6/6,36; and mixtures thereof.

22. The golf equipment of claim 15, wherein the co-component polymer is a thermoplastic polymer selected from the group consisting of poly(amides); poly(ethylene terephthalates); poly(butylene terephthalates); poly(trimethylene terephthalates); poly(ethylene naphthalates); poly(vinyl alcohols); poly(vinyl acetates); poly(silanes); poly(vinylidene fluorides); acrylonitrile-butadiene-styrene copolymers; and mixtures thereof.

23. A method of forming golf equipment selected from the group consisting of golf club head additions, golf bags, golf bag framework, and portions thereof comprising the steps of:

providing at least one ionomer comprising a polymer having a sulfonated ionomeric moiety; and forming golf equipment from said at least one ionomer.

24. The method of claim 23, wherein the at least one ionomer is selected from the group consisting of sulfonated thermoplastic elastomers, sulfonated thermoplastic polymers, sulfonated thermoset polymers, and mixtures thereof.

25. The method of claim 24, wherein the sulfonated thermoplastic polymer is selected from the group consisting of olefinic polymers; polyamides; polyesters; a polystyrene; poly(alkyl)acrylates; polycarbonates; polyphenylene oxides; polyether ketones; polysulfones; poly(phenylene sulfides); poly(ether imides); and mixtures thereof.

26. The method of claim 24, wherein the sulfonated thermoplastic elastomer is selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers; a thermoplastic elastomer blend comprising polypropylene and ethylene-propylene-diene terpolymer or ethylene-propylene copolymer rubber wherein the rubber is dynamically vulcanized; and mixtures thereof.

27. The method of claim 24, wherein the sulfonated thermoset polymer is selected from the group consisting of poly(isoprene); poly(butadiene); poly(octenemer); styrene-butadiene rubber; ethylene-propylene-diene terpolymer rubber; ethylene-propylene copolymer rubber; nitrile rubber; butyl rubber; poly(urethane); poly(urea); poly(siloxane); and mixtures thereof.

28. Golf equipment selected from the group consisting of golf clubs, golf club head additions, club components, golf shoes, golf shoe components, golf bags, golf bag framework, and portions thereof formed of a composition comprising at least one ionomer formed from at least one sulfonated polyamide.

29. The golf equipment of claim 28, wherein said composition further comprises at least one co-component polymer and wherein the composition comprises a blend of from about 1 weight % to about 99 weight % of said at least one ionomer formed from at least one sulfonated polymer and from about 99 weight % to about 1 weight % of said at least one co-component polymer.

30. The golf equipment of claim 29, wherein the co-component polymer is selected from the group consisting of conventional ionomers, non-ionomeric thermoplastic elastomers, non-ionomeric thermoplastic polymers, non-ionomeric thermoset polymers, and mixtures thereof.

31. The golf equipment of claim 30, wherein the co-component polymer is selected from the group consisting of block copoly(ester-esters); block copoly(ester-ethers); block copoly(amide-esters); block copoly(amide-ethers); block copoly(urethane-esters); block copoly(urethane-ethers); block polystyrene thermoplastic elastomers; a thermoplastic elastomer blend comprising polypropylene and ethylene-propylene-diene terpolymer or ethylene-propylene copolymer rubber wherein the rubber is dynamically vulcanized; and mixtures thereof.

32. The golf equipment of claim 30, wherein the co-component polymer is a thermoplastic polymer selected from the group consisting of poly(amides); poly(ethylene terephthalates); poly(butylene terephthalates); poly(trimethylene terephthalates); poly(ethylene naphthalates); poly(vinyl alcohols); poly(vinyl acetates); poly(silanes); poly(vinylidene fluorides); acrylonitrile-butadiene-styrene copolymers; and mixtures thereof.

33. The golf equipment of claim 32, wherein the non-ionomeric thermoplastic polymer is a polyamide polymer having a flexural modulus from about 3,000 psi to about 500,000 psi.

34. The golf equipment of claim 33, wherein the polyamide polymer is selected from the group consisting of polyamide homopolymers, polyamide copolymers, and mixtures thereof.

35. The golf equipment of claim 34, wherein the polyamide polymer is at least one of a polyamide homopolymer selected from the group consisting of polyamide 6; polyamide 11; polyamide 12; and mixtures thereof.

36. The golf equipment of claim 34, wherein the polyamide polymer is at least one of a polyamide copolymer selected from the group consisting of polyamide 4,6; polyamide 6,6; polyamide 6,9; polyamide 6,10; polyamide 6,12; polyamide 6,18; polyamide 6,36; polyamide 6/6,6; polyamide 6,6/6,10; polyamide 6/6,T; polyamide 6/6,6/6,10; polyamide 6/6,6/6,18; polyamide 6/6,6/6,36; and mixtures thereof.

* * * * *